Patented Sept. 7, 1948

2,448,599

UNITED STATES PATENT OFFICE 2,448,599

SUSPENDING AGENT FOR BEVERAGES

Karl W. Karnopp, Waukegan, Ill., assignor to The Kalva Corporation, Waukegan, Ill., a corporation of Illinois No Drawing. Application February 17, 1945, Serial No. 578,553

8 Claims. (Cl. 99—25)

This invention relates to an improved suspending agent for beverages.

One of the objects of the invention is to provide an improved agent for suspending flavors such as chocolate, cocoa powder, and so forth, in liquid mediums, such as water or milk, to produce flavored beverages.

More specifically, it is an object of the invention to provide a suspending agent which comprises an extract of marine algae.

A further object of the invention is the provision of an improved suspending agent comprising the extraction of an algae of the genus Iridophycus.

Another specific object of the invention is the provision of an improved suspending agent comprising an extraction of marine algae of the genus Iridophycus and of the species flaccidum.

In the manufacture of flavored beverages such as chocolate drinks, milk or water usually provide the liquid medium, and the flavor is maintained in suspension through the use of one or more of a number of suspending agents such as starch, alginate, Irish moss extract or the like.

Of late years one of the more popular suspending agents is Irish moss, which is susceptible to at least one difficulty in that no two runs of extracts derived from this material are completely alike, even though the Irish moss selected may be obtained from the same rock formation and harvested at the same time of the year. One batch of extract may work excellently when made into a syrup which is mixed with cold milk or water. Another batch made from material which appears identical will be found to have almost no suspending powers at all.

The extract of Iridophycus flaccidum appears to have uniform suspending powers regardless of its place of harvest or the time of year at which the harvest was made.

The usual suspending agents also have a material effect upon the physical properties of the flavoring syrup into which they are incorporated and frequently cause considerable thickening. A flavoring syrup into which Irish moss is incorporated as a suspending agent will, after the Irish moss extract has been added, acquire a rubbery, highly gelatinous texture unless the syrup is cooled under agitation to a temperature below 150°, at which point the rubbery, gelatinous consistency disappears. This cooling process necessitates either several hours time in conventional syrup making equipment or expensive special equipment, and as it cools a rubber, gelatinous coating is formed on the cooling surface, which insulates the cooling surface and slows down the cooling. This improved suspending agent does not acquire a rubbery, gelatinous texture and can be cooled, to all practical purposes, as fast as a syrup which contains no suspending agent. It has been further determined that this syrup needs no cooling at all and that it may be packaged as soon as the suspending agent has been incorporated into it, thus saving the expense and time involved in cooling the product and resulting, because of the packing temperature, in a product whose keeping qualities are definitely superior to a product which must be packed at 145° F.

The applicant has discovered a new and improved suspension agent which reacts more uniformly in drinks made by adding a prepared syrup containing this suspending agent to cold water or milk, and which also reacts more efficiently than the suspending agents which are now available. Approximately 40 per cent extractive solids may be recovered from Irish moss. The marine algae under consideration yields from 60 to 80 per cent extractive solids.

The applicant prepared a suspending agent which comprises an extract of marine algae of the genus Iridophycus. The species flaccidum has been discovered to be very useful. The marine algae is collected from rocks exposed at low tides, or during off-shore winds, on sea coasts, bays or sounds. After harvesting, the algae should be rinsed in fresh water, and if desired, may be dried. It has been found that the marine odor and flavor peculiar to most algae can be largely removed if the material is bleached, although the use of this material is not limited to bleached algae. The suspending agent may be extracted either from the dried weed or from the weed as it comes from the ocean by soaking it in boiling water for a period of approximately one hour. Agitation during the soaking process has been found to be helpful.

The solution is then filtered to remove the insoluble parts of the algae so that a liquid suspending agent remains.

The suspending agent then may be boiled with a previously prepared chocolate syrup. Thereafter, the finished syrup may be mixed with milk or water according to taste to obtain a desired flavor balance. The amount of suspension agent used in such mixtures depends upon the proportions of syrup and liquid, and can be determined easily by trial and error. It is not necessary to cool this syrup containing the suspension agent before packaging it for shipment.

After the finished syrup containing the suspending agent has been gently stirred into the cold milk, the chocolate and/or cocoa particles stay in nearly perfect suspension.

The flavored milk thus produced may be pasteurized at normal pasteurizing temperatures without affecting the viscosity or flavor.

I claim:

1. A non-settling chocolate flavored beverage including in combination a potable chocolate beverage and a suspending agent consisting of the water soluble extract of Iridophycus.

2. A potable chocolate beverage containing the water soluble extract of Iridophycus.

3. A lacteal beverage containing cocoa and a suspending agent consisting of the water soluble extract of Iridophycus.

4. An aqueous beverage containing cocoa and a suspending agent consisting of the water soluble extract of Iridophycus.

5. A non-settling chocolate flavored beverage including in combination a potable chocolate beverage and a suspending agent consisting of the water soluble extract of *Iridophycus flaccidum*.

6. A potable chocolate beverage containing the water soluble extract of *Iridophycus flaccidum*.

7. A lacteal beverage containing cocoa and a suspending agent consisting of the water soluble extract of *Iridophycus flaccidum*.

8. An aqueous beverage containing cocoa and a suspending agent consisting of the water soluble extract of *Iridophycus flaccidum*.

KARL W. KARNOPP.

REFERENCES CITED

The following references are of record in the file of this patent:

UNITED STATES PATENTS

| Number | Name | Date |
| --- | --- | --- |
| 2,002,963 | Schade | May 28, 1935 |
| 2,007,218 | Seltzer | July 9, 1935 |
| 2,097,225 | Green et al | Oct. 26, 1937 |

OTHER REFERENCES

Mix Stabilizers, by Prof. P. H. Tracey, published in the Ice Cream Review, vol. 24, No. 8, March 1941, pages 44, 92, 93, 94.

Certificate of Correction

Patent No. 2,448,599.  September 7, 1948.

KARL W. KARNOPP

It is hereby certified that error appears in the printed specification of the above numbered patent requiring correction as follows:

Column 1, line 54, for the word "rubber" read *rubbery*;

and that the said Letters Patent should be read with this correction therein that the same may conform to the record of the case in the Patent Office.

Signed and sealed this 14th day of December, A. D. 1948.

[SEAL]

THOMAS F. MURPHY,
*Assistant Commissioner of Patents.*